(12) United States Patent
Gogolla et al.

(10) Patent No.: US 10,048,378 B2
(45) Date of Patent: Aug. 14, 2018

(54) METHOD AND DEVICE FOR DETERMINING THE POSITION COORDINATES OF A TARGET OBJECT

(71) Applicant: Hilti Aktiengesellschaft, Schaan (LI)

(72) Inventors: Torsten Gogolla, Schaan (LI); Andreas Winter, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 243 days.

(21) Appl. No.: 14/654,434

(22) PCT Filed: Dec. 17, 2013

(86) PCT No.: PCT/EP2013/076802
§ 371 (c)(1),
(2) Date: Jun. 19, 2015

(87) PCT Pub. No.: WO2014/095784
PCT Pub. Date: Jun. 26, 2014

(65) Prior Publication Data
US 2015/0346341 A1  Dec. 3, 2015

(30) Foreign Application Priority Data

Dec. 20, 2012 (DE) .......... 10 2012 223 928

(51) Int. Cl.
*G01S 17/46* (2006.01)
*G01S 7/491* (2006.01)
(Continued)

(52) U.S. Cl.
CPC ............ *G01S 17/46* (2013.01); *G01C 15/002* (2013.01); *G01S 7/4913* (2013.01); *G01S 17/023* (2013.01)

(58) Field of Classification Search
CPC ....... G01C 15/00; G01S 5/163; G06T 3/4038; G06T 3/0062; G06K 9/32
See application file for complete search history.

(56) References Cited

U.S. PATENT DOCUMENTS

| 6,133,998 A * | 10/2000 | Monz .................. G01C 15/002 356/141.1 |
| 7,720,554 B2 | 5/2010 | DiBernardo et al. |
| 2009/0138233 A1* | 5/2009 | Kludas .................. G01C 15/00 702/158 |

FOREIGN PATENT DOCUMENTS

| EP | 0 481 278 A1 | 4/1992 |
| EP | 1 422 499 A2 | 5/2004 |

(Continued)

OTHER PUBLICATIONS

PCT/EP2013/076802, International Search Report dated Feb. 7, 2014 (Two (2) pages).

(Continued)

*Primary Examiner* — Luke D Ratcliffe
(74) *Attorney, Agent, or Firm* — Crowell & Moring LLP (57) ABSTRACT

A method and device for determining position coordinates of a target object is disclosed. The method includes positioning a target device on the target object, transmitting a laser beam onto the target device, reflecting the laser beam off of the target device, recording an image of the target device by a camera device with the reflected laser beam as a light reflection in the image, and determining a focus of the light reflection in the image. The reflected laser beam is received and a distance to the target object is calculated from the received beam. A first offset is calculated from a focal length of the camera device, the calculated distance to the target object, and a first image coordinate of the focus of the light reflection in the image. The position coordinates of the target object are calculated from the distance and the first offset.

24 Claims, 3 Drawing Sheets

(51) Int. Cl.
    *G01S 17/02*     (2006.01)
    *G01C 15/00*     (2006.01)

(56) References Cited

FOREIGN PATENT DOCUMENTS

| EP | 1 605 230 A1 | 12/2005 |
|---|---|---|
| EP | 2 447 735 A1 | 5/2012 |
| WO | WO 97/14015 A1 | 4/1997 |
| WO | WO 2006/053837 A1 | 5/2006 |

OTHER PUBLICATIONS

German Office Action dated Aug. 5, 2013 (Three (3) pages).
U.S. Patent Application, "System and Method for Camera Based Position and Orientation Measurement", U.S. Appl. No. 14/049,607, filed Oct. 9, 2013, Paul Yalden Montgomery et al.
U.S. Patent Application, "Method and Device for Determining the Position Coordinates of a Target Object", U.S. Appl. No. 14/654,418, filed Jun. 19, 2015, Christoph Wuersch et al.
U.S. Patent Application, "Method and Device for Determining the Two-Dimensional Positional Coordinates of a Target Object", U.S. Appl. No. 14/654,439, filed Jun. 19, 2015, Torsten Gogolla et al.

\* cited by examiner

METHOD AND DEVICE FOR DETERMINING THE POSITION COORDINATES OF A TARGET OBJECT

This application claims the priority of International Application No. PCT/EP2013/076802, filed Dec. 17, 2013, and German Patent Document No. 10 2012 223 928.6, filed Dec. 20, 2012, the disclosures of which are expressly incorporated by reference herein.

BACKGROUND AND SUMMARY OF THE INVENTION

The present invention relates to a method for determining the position coordinates of a target object and a device for determining the position coordinates of a target object.

A method and a device are known from EP 0 481 278 A1 for determining two- or three-dimensional position coordinates of a target object. The device comprises a laser distance measuring device, a camera device, a reference device and a control device. The laser distance measuring device has a transmitting element that transmits a laser beam and a receiver element that receives as a reception beam a laser beam at least partially reflected on the target object. The reference device has a first and second axis arranged perpendicular to each other and spanning an internal coordinate system; a third axis of the coordinate system is perpendicular to the first and second axes through the intersection of the axes. The device also includes a first and second angle measuring device for determining an azimuth angle and an elevation angle. The target object is sighted precisely through the camera device while the target axis of the laser distance measuring device and the sighting axis of the camera device are aligned to the target object. The laser distance measurement is performed by the laser distance measuring device and the angle values for the azimuth and elevation angles are determined by the angle measuring devices. The two-dimensional position coordinates are calculated from the distance value and the azimuth angle, the elevation angle is also necessary for the three-dimensional position coordinates.

The known device for determining the position coordinates of a target object has the disadvantage that at least one angle measuring device is necessary, which increases the complexity and cost of the device for determining the position coordinates. Furthermore, the laser beam must be precisely aligned to the target object for the laser distance measurement and the angle measurement.

The object of the present invention is to develop a method for determining the position coordinates of a target object in two or three dimensions that is suitable for interior use. In addition, a suitable device for the invention's method is to be developed for determining the position coordinates of a target object, where the position coordinates can be calculated with high accuracy with limited equipment expense.

This object is achieved according to the invention in the method for determining the position coordinates of a target object, and in the device for determining the position coordinates of a target object.

According to the invention, the method for determining the position coordinates of a target object in a measurement range in at least two dimensions has the following steps:

a target device with a reflector element is positioned on the target object,
a laser beam is transmitted by a transmitting element of a laser distance measuring device onto the target device,
at least a part of the laser beam is partially reflected on the reflector element,
an image of the target device with the at least partially reflected laser beam is recorded as light reflection by a camera device,
a focus of the light reflection is determined in the image of the target device,
the laser beam at least partially reflected on the reflector element is received as the received beam by a receiver element of the laser distance measuring device,
a distance to the target object is calculated from the received beam,
a first offset is calculated from a focal length of the camera device, the calculated distance to the target object, and a first image coordinate of the focus of the light reflection,
the position coordinates of the target object are calculated from the distance and the first offset.

Determining the position coordinates of the target object with the help of a laser distance measurement and a light reflection in an image of a camera device has the advantage that no expensive angle measuring device is necessary, yet the position coordinates can be determined with a high accuracy. The reflector element of the target device produces a reflected laser beam that is visible in an image of the target device as light reflection. The invention's method is suitable for stationary targets and moving targets.

In a development of the method, a second offset is calculated from the focal length of the camera device, the distance to the target object, and a second image coordinate of the focus of the light reflection, and the position coordinates of the target object are additionally calculated from the second offset. The second offset enables determination of three-dimensional position coordinates of a target object in a measurement space. Among other things, the geometry of the target device determines whether the method for determining two- or three-dimensional position coordinates can be used. For determining two-dimensional position coordinates, a target device in the shape of a circular cylinder or a circular cylinder section is used, and for determining three-dimensional position coordinates a spherical or spherical-segment-shaped target device is used.

Preferably, a sequence of images of the target device is recorded with the camera device. The laser beam directed at the target device can be formed as an expanded laser beam with an aperture angle greater than 80°, as a moving laser beam, or as a moving laser beam with an aperture angle smaller than 10°. The expansion of the laser beam can occur in one direction or in two directions perpendicular to the propagation direction of the laser beam. With an expanded, non-moving laser beam, the laser beam is at least partially reflected on the reflector element of the target device and produces in the image of the target device a light reflection. If the camera device records a sequence of images of the target device, the light reflection is visible so long as the laser beam is transmitted. With a moving laser beam, the camera device records both images of the target device with light reflection and images without light reflection.

In a first variant of the method, from the sequence of the images recorded with the camera device the image with the strongest light reflection is determined as the image of the target device with the light reflection. The first variant is suited mainly for moving laser beams in which the sequence of the images recorded with the camera device has both images with light reflection and images without light reflection. The image with the strongest light reflection can be determined with the help of known image processing techniques.

In a second variant of the method, the image of the target device with the light reflection is determined by averaging over multiple images from the sequence of images recorded with the camera device. The second variant is suitable mainly for non-moving laser beams in which the light reflection in the images is visible so long as the laser beam is transmitted. The averaging over multiple images with a light reflection can be done with the help of known image processing techniques.

In a preferred embodiment of the method, the recording of the images of the target device with the camera device and the distance measurement to the target device with the laser distance measuring device are started simultaneously by a control device. The laser distance measuring device and the camera device are synchronized by the simultaneous start of the distance measurement and the recording of the images of the target device. The synchronization is advantageous for moving target objects. Since the measurement time for a distance measurement and the exposure time for the camera device usually differ from each other, the distance values and the images of the target device are not determined at the same time. The measured distance values and recorded images of the target device can be associated with each other through the synchronization. The closer to each other the times of the distance measurement and the recording of the image, the smaller the error in the position coordinates. For fast-moving target objects, the correct assignment between distance value and recorded image of the target device is important to limit the error.

Especially preferably, an image of the target device recorded by the camera device is associated by the control device with a distance value measured by the laser distance measuring device. The correct assignment between the measured distance values and the recorded images of the target device is mainly important for fast-moving target objects to reduce inaccuracies in the position coordinates. The control element of the laser distance measuring device can assign to each measured distance value a time after the start of the distance measurement, and the control element of the camera device can likewise assign to each recorded image of the target device a time after the start of the image recording. Through the simultaneous start, an evaluation element of the control device can assign the measured distance values and the recorded images of the target device to each other. An example of a suitable criterion for the assignment is that the image of the target device following in time is assigned to a distance value or the distance value following in time is assigned to an image.

For performing the invention's method in particular, the invention's device for determining the position coordinates of a target object in a measurement range in at least two dimensions comprises:
 a target device with a reflector element that specifies the position coordinates of the target object,
 a laser distance measuring device with a transmitting element that transmits a laser beam, a receiver element that receives as the received beam a laser beam at least partially reflected by the reflector element, and a control element,
 a camera device with a receiver device and a control element,
 a reference device with a first axis and a second axis, where the first and second axes are arranged perpendicular to each other and intersect at an intersection, and
 a control device with a control element for controlling the laser distance measuring device and the camera device, and an evaluation element for calculating the position coordinates of the target object.

The invention's device makes it possible to determine the position coordinates of a target object without an angle measuring device. The fact that an angle measuring device is not necessary makes it possible to realize an inexpensive device that can measure the position coordinates of the target object with high accuracy. The distance measurement with the laser distance measuring device and the recording of the target device's images with the camera device can be started at the same time through the control element of the control device.

In a preferred embodiment, the reflector element is designed as a rotationally symmetrical body or as a section of a rotationally symmetrical body. The geometry of the target device's reflector element decides whether the device can be used for determining two- or three-dimensional position coordinates. Circular cylinders or circular cylinder sections are suitable as a reflector element for two-dimensional measurements, and spheres or spherical sections are suitable for three-dimensional measurements. A rotationally symmetrical body has the advantage that the distance from the surface to the center is identical from all directions. The position coordinates of the target object lie on the cylinder axis of the circular cylinder or in the center of the sphere. The radius of the circular cylinder or the sphere is stored in the control device or entered into the control device by the operator. To calculate the position coordinates, the radius of the target device is added to the measured distance of the laser distance measuring device and to the image coordinates of the light reflection.

In a first variant, the laser distance measuring device has a beam shaping optical system that expands the laser beam with an aperture angle greater than 80°. The expansion of the laser beam can occur in one direction perpendicular to the propagation direction or in two directions perpendicular to the propagation direction of the laser beam. The expansion in one direction produces a line beam that is suitable for determination of two-dimensional position coordinates, and the expansion in two directions produces a spherical segment-like expanded laser beam for determination of three-dimensional position coordinates.

The expansion of the laser beam by a beam shaping optical system offers the possibility of using a stationary laser distance measuring device. The meter with the laser distance measuring device is disposed outside the measurement range or on the edge of the measurement range and arranged such that the expanded laser beam can cover the entire measurement range. The expansion of the laser beam with an aperture angle greater than 80° is mainly suited for determination of two-dimensional position coordinates. If the laser beam is expanded spherical-segment-like in two perpendicular directions each by an aperture angle greater than 80° and if the laser beam has limited power the danger exists that the power density for the received beam is too low for the evaluation. If there is sufficient power available in the laser beam, then a spherical-segment-like expanded laser beam with aperture angles greater than 80° can be used for determining three-dimensional position coordinates.

The term "beam shaping optical system" includes all beam shaping optical elements that expand, collimate, or focus a laser beam. The beam shaping optical system can consist of one optical element into which one or more optical functions are integrated or of multiple optical elements arranged one after the other. Cylinder lenses, cone mirrors, and similar optical elements are suitable as beam shaping optical systems for expanding a laser beam.

Particularly preferably, the beam shaping optical system expands the laser beam in a direction substantially parallel to the measuring plane. The beam shaping optical system particularly preferentially collimates or focuses the laser beam in a direction substantially perpendicular to the measuring plane. This beam shaping optical system is mainly suitable for determination of two-dimensional position coordinates and has the advantage that the laser beam's available power is used optimally. In determining two-dimensional position coordinates in the measuring plane, no expansion of the laser beams in the direction perpendicular to the measuring plane is necessary. The limited power of the laser beam is distributed in the measuring plane.

In a second variant, the laser distance measuring device has a motor unit, where the motor unit pivots the laser beam around an axis of rotation perpendicular to the measuring plane or around a pivot point. The rotation of the laser beams is useful if the power density of the laser beams after the expansion is too low to obtain a received beam strong enough for the laser distance measurement. The rotation of the laser beam around the axis of rotation perpendicular to the measuring plane can be performed as a rotating, scanning or tracking movement. In the rotating movement the laser beam is rotated continuously around the axis of rotation, in the scanning movement it is periodically moved back and forth around the axis of rotation, and in the tracking movement the laser beam follows the target device. The rotation of the laser beam around a pivot point is provided for the determination of three-dimensional position coordinates and is preferably used with a tracking device that follows the moving target device. The motor unit of the second variant can be combined with a beam shaping optical system that collimates or focuses the laser beam.

In a third variant, the laser distance measuring device has a beam shaping optical system and a motor unit, where the beam shaping optical system expands the laser beam with an aperture angle of up to 10° and the motor unit moves the laser beam around an axis of rotation perpendicular to the measuring plane or around a pivot point. The expansion of the laser beam and the rotation around an axis of rotation (two-dimensional) or a pivot point (three-dimensional) can be combined. The laser beam is expanded by a beam shaping optical system up to 10° and the expanded laser beam is moved by a motor unit around an axis of rotation or around a pivot point. The combination of beam expansion and rotation enables detection of a received beam with a power density strong enough for the evaluation of the light reflection. The expansion of the laser beam can occur in one or two directions perpendicular to the propagation direction of the laser beam. The rotation of the laser beam can be performed as rotating, scanning or tracking movement.

In a first preferred embodiment, the target device of the invention's device is attached to a hand-held tool apparatus. When work is being done with the hand-held tool apparatus, the tool apparatus's current position coordinates can be determined with the invention's device.

Exemplary embodiments of the invention are described below based on the drawings. These do not necessarily represent the exemplary embodiments to scale; instead, where useful for the explanation the drawing is produced in schematic and/or slightly distorted form. Reference is made to the relevant prior art with respect to additions to the teachings that can be directly learned from the drawing. It must be kept in mind that various modifications and changes to the form and detail of an embodiment can be made without deviating from the invention's general idea. The invention's features disclosed in the description, the drawings and the claims can be essential both individually by themselves and also in any combination for the invention's development. In addition, all combinations of at least two of the features disclosed in the description, drawings, and/or claims fall within the invention's framework. The invention's general idea is not restricted to the exact shape or detail of the preferred embodiment shown and described below or limited to a subject matter that would be restricted compared to the subject matter claimed in the claims. With the given dimensions, values lying within the stated limits should also be disclosed as limit values and ones that can be used and claimed at will. For the sake of simplicity, the same reference signs are used below for identical or similar parts or parts with identical or similar function.

DETAILED DESCRIPTION OF THE DRAWINGS

Figure 1:
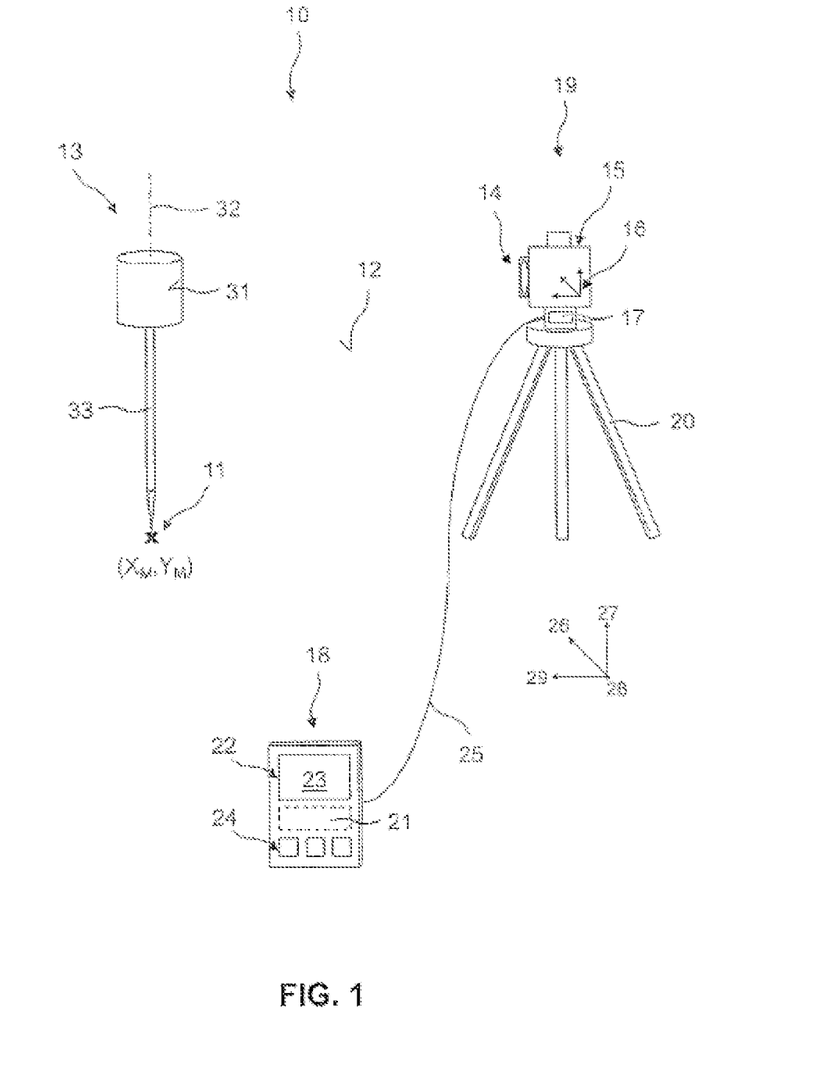
FIG. 1 illustrates a device according to the invention for determining the position coordinates of a target object in a measuring plane consisting of a target device, a laser distance measuring device, a camera device, a reference device, a control device, and a handle.

FIG. 1 shows a device 10 according to the invention for determining the position coordinates $X_M$, $Y_M$ of a target object 11 in a measurement range 12. The measurement range 12 is formed as a surface and the position coordinates $X_M$, $Y_M$ of the target object 11 are two-dimensional. FIG. 1 shows the essential components of the device 10 in a schematic representation.

The device 10 comprises a target device 13, a laser distance measuring device 14, a camera device 15, a reference device 16, a control device 17 and a handle 18. As an alternative to the separation of target device 13 and handle 18 shown in FIG. 1, the target device can be integrated into the handle. The laser distance measuring device 14, the camera device 15, the reference device 16, and the control device 17 are integrated into a meter 19, which in the embodiment shown in FIG. 1 is attached to a device stand 20. The handle 18 has a control element 21, a display element 22 with a display 23, and an operating device 24. As an alternative to the arrangement in the meter 19, the control device 17 can be arranged in the handle 18. The meter 19 and the handle 18 are connected with each other through a wireless communication link 25.

The reference device 16 comprises a first and a second axis 26, 27, which are arranged perpendicular to each other and intersect at an intersection 28. The first and second axes 26, 27 span an internal coordinate system. A third axis 29 of the coordinate system runs perpendicular to the first and second axes 26, 27 through the intersection 28 of the two axes 26, 27. The first and second axes 26, 27 span an image plane of the camera device 15, and the line of sight of the camera device 15 runs parallel to the third axis 29.

The position of the target object 11 in the measuring plane 12 is marked with the help of the target device 13. The target device 13 has a reflector element 31 for partial reflection of a laser beam of the laser distance measuring device 14. The reflector element 31 in the embodiment shown in FIG. 1 is designed as a circular cylinder, and the position coordinates of the target object 11 lie on the cylinder axis 32 of the reflector element 31. For the invention's device 10, it is important that the position coordinates of the target object 11 that are located in the center have the same spacing from each point on the surface. This condition is fulfilled in the plane by a circle or a circle section.

The distance from the surface of the reflector element 31 to the target object 11 is stored in the control device 17 or entered by the operator into the control device 17. The reflector element 31 can be fastened to a measuring stick 33 and is positioned by the operator on the target object 11. To orient the cylinder axis 32 of the reflector element 31 perpendicular to the measuring plane 12, a leveling device, for example in the form of a bubble level or another gradient sensor, can be integrated into the measuring stick 33. As an alternative to the measuring stick 33, the target device 13 can be fastened to a wall or ceiling, placed on a floor, or, for example, fastened to a vehicle or a tool apparatus.

The two-dimensional position coordinates $X_M, Y_M$ of the target object 11 are determined from the distance D between the laser distance measuring device 14 and the target object 11 as well as an image coordinate of the reflected laser beam in the image of the camera device 15. The target device 13 is positioned in the measuring plane 12 on the target object 11. It is assured that the cylinder axis 32 of the reflector element 31 is oriented perpendicular to the measuring plane 12. If the position coordinates of the target object 11 are to be determined in an external coordinate system that differs from the internal coordinate system 26, 27 of the meter 19, the coordinate systems are superimposed or the displacement and/or rotation are determined and manually entered on the meter 19 or automatically communicated to the control device 17. The axes 26, 27, 29 of the meter 19 are oriented, for example, parallel to the coordinate axes of the external coordinate system. After the coordinate system is oriented the measurement can be performed; the operator starts the measurement through a start button or a start command on the handle 18.

Besides determining position coordinates of an existing target object, the device 10 can also be used for finding position coordinates. To do this, the user guides a reflector element equipped with a measuring tip or similar, which can also be integrated into the handle, over a measuring surface and searches for predetermined position coordinates. The position coordinates can be manually entered in the handle or are communicated through a communication link from another device to the device.

Figure 2:
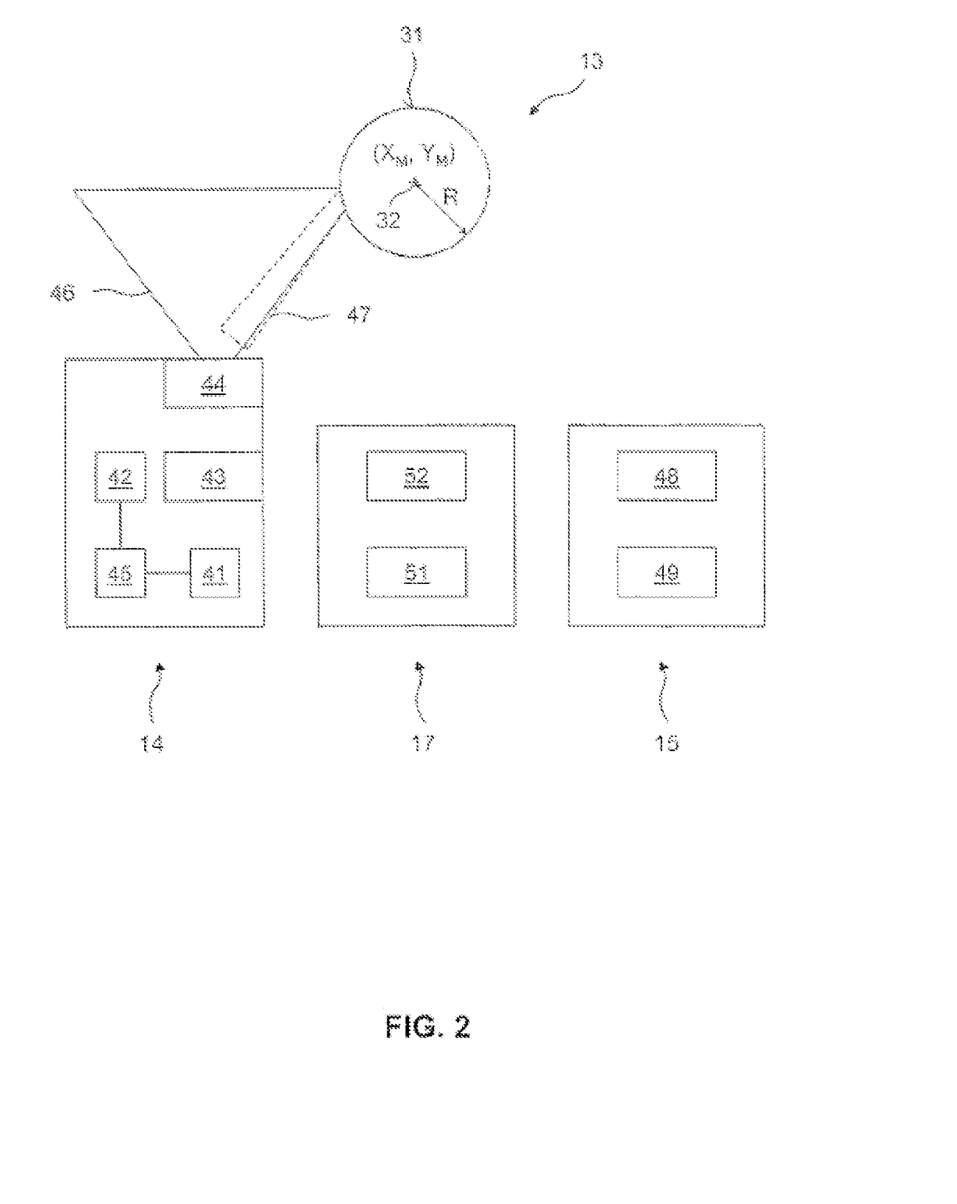
FIG. 2 illustrates the device of FIG. 1 with the laser distance measuring device, the camera device, and the control device in the form of a block diagram.

FIG. 2 shows in the form of a block diagram the essential components of the meter 19 and its interaction in determining the position coordinates of the target object 11. In the meter 19 are the laser distance measuring device 14, the camera device 15, and the control device 17.

The laser distance measuring device 14 has a coaxial structure and comprises a transmitting element 41 designed as a laser diode, a receiver element 42 designed as a photodetector, a beam splitting optical system 43, a beam shaping optical system 44, and a control element 45. The laser diode 41 transmits a laser beam 46 that is aimed at the target device 13. A laser beam at least partially reflecting on the reflector element 31 of the target device 13 is detected as the received beam 47 by the photodetector 42. The control element 45 is connected with the laser diode 41 and the photodetector 42. In the coaxial structure of the laser distance measuring device 14 shown in FIG. 2, the laser beam 46 transmitted by the laser diode 41 is spatially separated from the received beam 47 with the help of the beam splitting optical system 43. Instead of a coaxial laser distance measuring device, a biaxial laser distance measuring device in which the transmitted laser beam and the received beam are offset in parallel can be used.

The beam shaping optical system 44 can be designed as an individual optical element or as a system of multiple optical elements, and shapes both the laser beam 46 and the received beam 47. In contrast to known laser distance measuring devices that use a focused, point-shaped laser beam, with the invention's device 10 it is necessary that the laser beam 46 cover a larger area. This can be achieved by expanding the laser beam 46 in the measuring plane 12 and/or by a rotation of the laser beam 46 around an axis of rotation perpendicular to the measuring plane 12. FIG. 2 shows a laser distance measuring device 14 in which the laser beam 46 is expanded by means of a suitable beam shaping optical system 44. Among others, cylindrical lenses and optical cones are suitable as beam shaping optical systems 44 for the expansion.

The camera device 15 is designed, for example, as a CCD camera and comprises a receiver device 48 and a control element 49 for controlling the camera device 15 and for evaluating the images recorded. To determine two-dimensional position coordinates a row of pixels arranged in a measuring plane 12 is required. With three-dimensional position coordinates, the camera device 15 has several rows of pixels.

The control device 17 controls the invention's method for determining the position coordinates of the target object 11 by means of the laser distance measuring device 14 and the camera device 15. The control device 17 comprises a control element 51 for controlling the laser distance measuring device 14 and the camera device 15, and an evaluation element 52 for calculating the position coordinates $X_M, Y_M$ of the target object 11.

In the structure of the laser distance measuring device 14 and the camera device 15 represented in FIG. 2, the laser distance measuring device 14 has the control element 45 and the camera device 15 has the control element 49. The control elements 45, 49 can be designed as separate control elements or integrated with the control device 17 into a common control device. A common control device is useful if the control device 17 is arranged in the meter 19. If by contrast the control device 17 is arranged in the handle 18, separate control elements are advantageous since the raw data of the laser distance measuring device 14 and the camera device 15 do not have to be transmitted through the communication link 25 to the handle 18.

The operator starts the determination of the position coordinates through a start command on the handle. The start command is converted by the control element 51 of the control device 17 into a first control command to the laser distance measuring device 14 and a second control command to the camera device 15. Based on the first control command, the transmitting element 41 of the laser distance measuring device 14 transmits the laser beam 46, which strikes the reflector element 31 and is partially reflected on the reflector element 31. The reflected portion of the laser beam 46 strikes the receiver element 42 of the laser distance measuring device 14 as the received beam 47. The control element 45 of the laser distance measuring device 14 determines from the received beam 47 and a reference beam decoupled from the laser beam 46 the distance between the laser distance measuring device 14 and the reflector element 31. For the distance D to the target object 11, the radius R of the circular cylindrical reflector element 31 is added.

Based on the second control command, the camera device 15 records a series of images of the target device 13. The images of the camera device 15 are evaluated with the help of known image processing techniques. The laser beam 46 partially reflected on the reflector element 31 is visible as light reflection in at least one image of the target device 13. The control element 52 of the camera device 15 determines, using known image processing techniques, the image of the target device 13 having the strongest light reflection. As an alternative to the image with the strongest light reflection, several images in which a light reflection is visible can be averaged.

Figure 3:
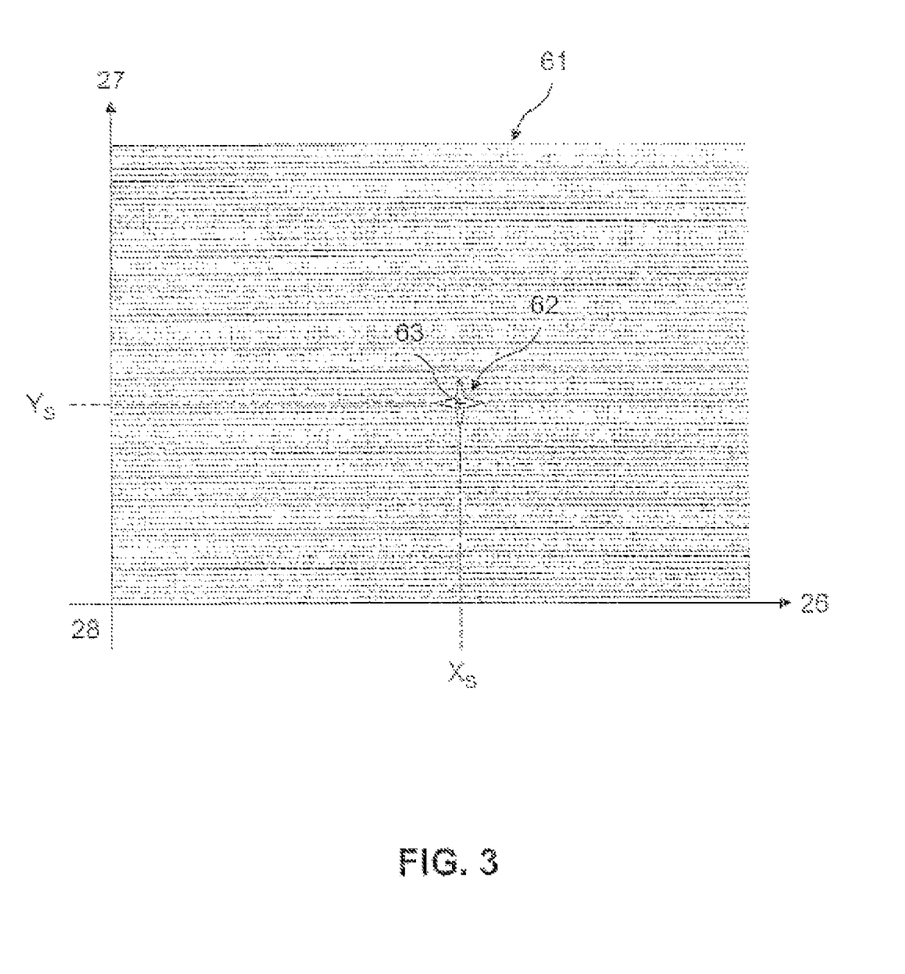
FIG. 3 illustrates an image of the target device recorded with the camera device with a reflected laser beam as light reflection that is evaluated to determine the position coordinates of the target object.

FIG. 3 shows an image 61 of the target device 13 with a light reflection 62 that is evaluated for determining the position coordinates of the target object 11. The image 61 consists of an array of pixels arranged in rows and columns, with the number of pixels determined by the resolution of the camera device 15.

In image 61 of the target device 13, the control element 49 of the camera device 15 uses known image processing techniques to determine a focus 63 of the light reflection 62. In the internal coordinate system 26, 27 of the camera device 15, the focus 63 of the light reflection 62 has a first image coordinate $X_S$ and a second image coordinate $Y_S$. From the image coordinates $X_S$, $Y_S$ of the focus 63 of the light reflection 62, a first offset $d_1$ and a second offset $d_2$ are calculated with a focal length f of the camera device 15.

The invention claimed is:

1. A method for determining position coordinates of a target object in a measurement range in at least two dimensions, comprising the steps of:
    positioning a target device with a reflector element on the target object;
    transmitting a laser beam by a transmitting element of a laser distance measuring device onto the target device;
    reflecting at least part of the laser beam off of the reflector element as a reflected laser beam;
    recording an image of the target device by a camera device with the reflected laser beam as a light reflection in the image;
    determining a focus of the light reflection in the image;
    receiving the reflected laser beam as a received beam by a receiver element of the laser distance measuring device;
    calculating a distance to the target object from the received beam;
    calculating a first offset from a focal length of the camera device, the calculated distance to the target object, and a first image coordinate of the focus of the light reflection in the image; and
    calculating the position coordinates of the target object from the distance and the first offset
    wherein a sequence of images of the target device is recorded by the camera device, and
    wherein an image from the sequence of images with a strongest light reflection is used for determining the focus of the light reflection.

2. The method according to claim 1, further comprising:
    calculating a second offset from the focal length of the camera device, the calculated distance to the target object, and a second image coordinate of the focus of the light reflection in the image; and
    calculating the position coordinates of the target object using the second offset.

3. The method according to claim 1, wherein the steps of recording and calculating the distance are started simultaneously by a control device.

4. The method according to claim 3, wherein the image of the target device recorded by the camera device is assigned by the control device to the distance.

5. A device for determining position coordinates of a target object in a measurement range in at least two dimensions for performing the method according to claim 1, comprising:
    a target device with a reflector element that is positioned on the target object;
    a laser distance measuring device with a transmitting element that transmits a laser beam, a receiver element that receives as a received beam a portion of the laser beam that is reflected by the reflector element, and a control element;
    a camera device with a receiver device and a control element:
    a reference device with a first axis and a second axis, wherein the first axis and the second axis are arranged perpendicular to each other and intersect at an intersection; and
    a control device with a control element for controlling the laser distance measuring device and the camera device, and an evaluation element for calculating the position coordinates of the target object.

6. The device according to claim 5, wherein the reflector element is a rotationally symmetrical body or a section of a rotationally symmetrical body.

7. The device according to claim 5, wherein the laser distance measuring device has a beam shaping optical system that expands the laser beam with an aperture angle greater than 80°.

8. The device according to claim 7, wherein the beam shaping optical system expands the laser beam in a direction substantially parallel to a measuring plane.

9. The device according to claim 8, wherein the beam shaping optical system collimates or focuses the laser beam in a direction substantially perpendicular to the measuring plane.

10. The device according to claim 5, wherein the laser distance measuring device has a motor unit, wherein the motor unit pivots the laser beam around an axis of rotation perpendicular to a measuring plane or around a pivot point.

11. The device according to claim 5, wherein the laser distance measuring device has a beam shaping optical system and a motor unit, wherein the beam shaping optical system expands the laser beam with an aperture angle up to 10° and the motor unit moves the laser beam around an axis of rotation perpendicular to a measuring plane or around a pivot point.

12. The device according to claim 5, wherein the target device is attached to a hand-held tool apparatus.

13. A method for determining position coordinates of a target object in a measurement range in at least two dimensions, comprising the steps of:
    positioning a target device with a reflector element on the target object;
    transmitting a laser beam by a transmitting element of a laser distance measuring device onto the target device;
    reflecting at least part of the laser beam off of the reflector element as a reflected laser beam;

recording an image of the target device by a camera device with the reflected laser beam as a light reflection in the image;
determining a focus of the light reflection in the image;
receiving the reflected laser beam as a received beam by a receiver element of the laser distance measuring device;
calculating a distance to the target object from the received beam;
calculating a first offset from a focal length of the camera device, the calculated distance to the target object, and a first image coordinate of the focus of the light reflection in the image; and
calculating the position coordinates of the target object from the distance and the first offset
wherein a sequence of images of the target device is recorded by the camera device, and
wherein an averaging over multiple images from the sequence of images is used for determining the focus of the light reflection.

14. The method according to claim 13, further comprising:
calculating a second offset from the focal length of the camera device, the calculated distance to the target object, and a second image coordinate of the focus of the light reflection in the image; and
calculating the position coordinates of the target object using the second offset.

15. The method according to claim 13, wherein the steps of recording and calculating the distance are started simultaneously by a control device.

16. The method according to claim 15, wherein the image of the target device recorded by the camera device is assigned by the control device to the distance.

17. A device for determining position coordinates of a target object in a measurement range in at least two dimensions for performing the method according to claim 13, comprising:
a target device with a reflector element that is positioned on the target object;
a laser distance measuring device with a transmitting element that transmits a laser beam, a receiver element that receives as a received beam a portion of the laser beam that is reflected by the reflector element, and a control element;
a camera device with a receiver device and a control element:
a reference device with a first axis and a second axis, wherein the first axis and the second axis are arranged perpendicular to each other and intersect at an intersection; and
a control device with a control element for controlling the laser distance measuring device and the camera device, and an evaluation element for calculating the position coordinates of the target object.

18. The device according to claim 17, wherein the reflector element is a rotationally symmetrical body or a section of a rotationally symmetrical body.

19. The device according to claim 17, wherein the laser distance measuring device has a beam shaping optical system that expands the laser beam with an aperture angle greater than 80°.

20. The device according to claim 19, wherein the beam shaping optical system expands the laser beam in a direction substantially parallel to a measuring plane.

21. The device according to claim 20, wherein the beam shaping optical system collimates or focuses the laser beam in a direction substantially perpendicular to the measuring plane.

22. The device according to claim 17, wherein the laser distance measuring device has a motor unit, wherein the motor unit pivots the laser beam around an axis of rotation perpendicular to a measuring plane or around a pivot point.

23. The device according to claim 17, wherein the laser distance measuring device has a beam shaping optical system and a motor unit, wherein the beam shaping optical system expands the laser beam with an aperture angle up to 10° and the motor unit moves the laser beam around an axis of rotation perpendicular to a measuring plane or around a pivot point.

24. The device according to claim 17, wherein the target device is attached to a hand-held tool apparatus.

* * * * *